Figure 1:
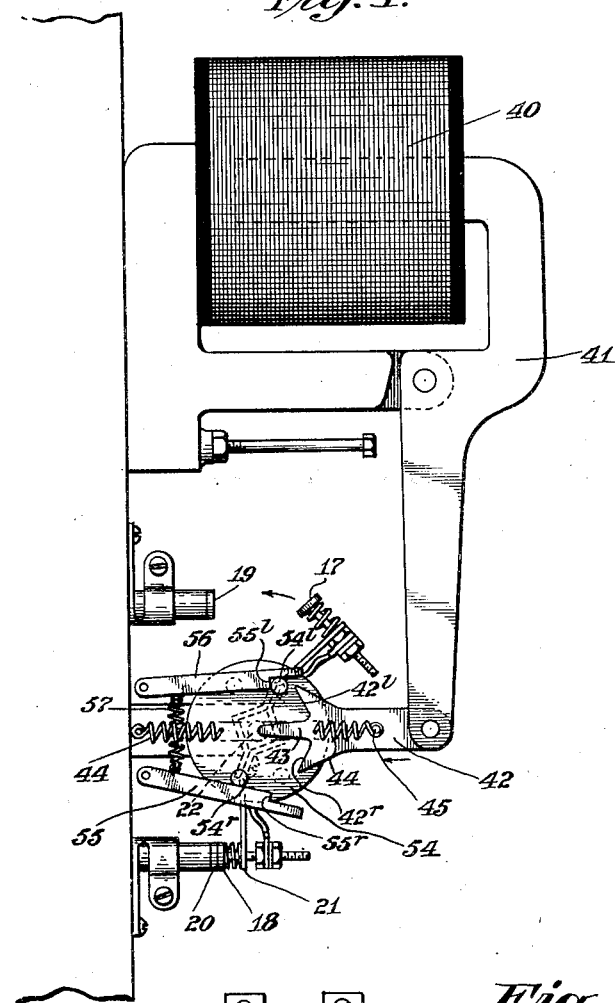

May 29, 1934.    W. DEANS    1,960,772
ELECTRIC SWITCH
Filed April 26, 1930    2 Sheets-Sheet 1

William Deans
INVENTOR
BY Wm. B. Whitney
ATTORNEY

May 29, 1934.  W. DEANS  1,960,772
ELECTRIC SWITCH
Filed April 26, 1930  2 Sheets-Sheet 2
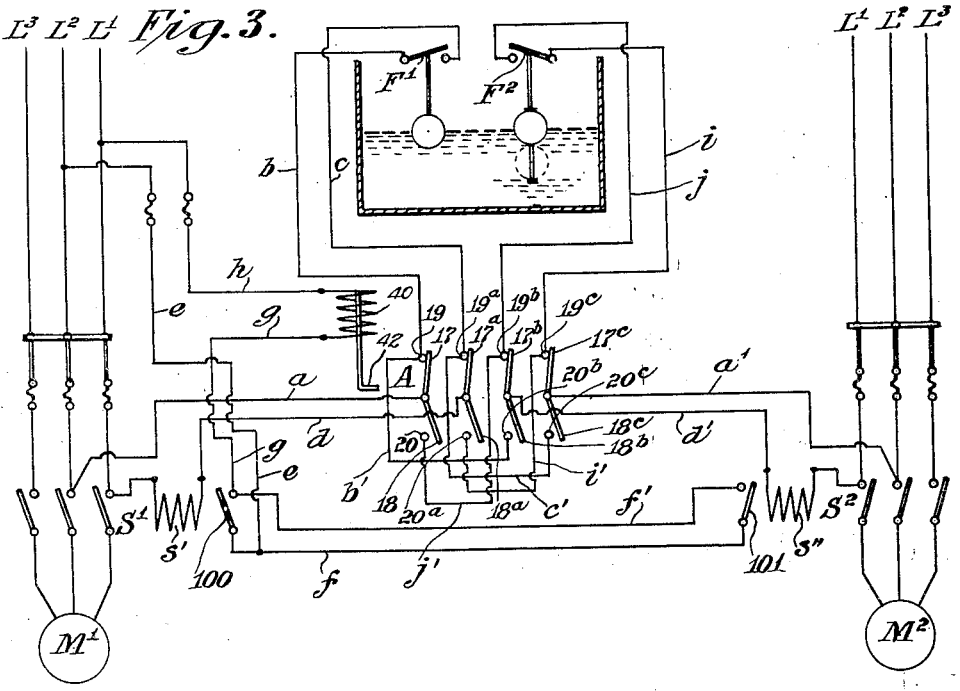

Patented May 29, 1934

1,960,772

UNITED STATES PATENT OFFICE 1,960,772

ELECTRIC SWITCH

William Deans, Ridgewood, N. J., assignor, by mesne assignments, to The Clark Controller Company, Cleveland, Ohio, a corporation of Ohio Application April 26, 1930, Serial No. 447,440

5 Claims. (Cl. 200—87)

The present invention relates to an automatic double-throw alternator switch; and the primary object thereof is to provide a simple and efficient switch of this type in which the position of the contacts of a single pole, or of a plurality of poles, will not be affected by the energization of an electromagnet but will be closed alternately on the successive de-energizations of the magnet, or vice versa.

This object I attain by a novel operative connection between the magnet and a rock-shaft carrying the double-throw contacts of the switch which comprises, broadly, a member carried by the armature or movable member of the magnet to reciprocate therewith normally and yieldingly in a path intersecting the axial line of the rock-shaft and a second member fixed to said shaft and so disposed and shaped that a surface or part on one side of its axis will lie in the normal path of travel of the first member and will be operatively engaged and rocked in one direction by said first member on its advance movement, thereby closing one set of the switch contacts and in so doing deflecting the first member somewhat from and bringing a similar surface or part on the opposite side of its own axis into the normal path of the first member, there to remain on the withdrawal of the first member and be operatively engaged and rocked in the opposite direction on the next advance movement of the first member.

While not limited as to the field of its utility, my new alternator switch is particularly adapted for use in connection with a motor-driven duplex pumping or similar apparatus where it is desired to operate the apparatus alternately, or in alternate sequence, and to such end I have provided the circuit connections whereby a circuit controlled by a float, pressure, or like switch will be connected through one set of contacts of a double-pole alternator switch with the starting circuit of one of two motors and through the second set of its contacts with the second motor, in such manner that the position of these contacts will not be affected by the starting up of the motors but on the stopping of either motor the alternator switch will be actuated to place the starting circuit of the other motor under the control of the float or like control switch, and a circuit controlled by a second float or like control switch will in like manner be alternately connected with the two motors through the contacts of the two additional poles of a four-pole alternator switch so that the motors will, if required, operate together in alternate sequence.

The invention will be fully understood from the following detailed description taken in connection with the accompanying drawings, in which—

Figure 2:
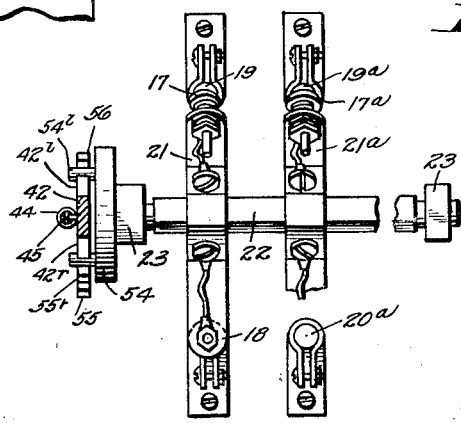

Figure 1 is an end elevational view of an alternator switch illustrating one practical embodiment of my invention, the magnet of the switch being shown as energized and the parts of the switch in position with the lower contacts closed; Fig. 2 is a fragmentary view, in front elevation, of parts of the switch in the position in which they are shown in Fig. 1; and Fig. 3 is a diagrammatic view of a typical duplex motor system in which the circuits of the two motors are connected up for control by two float switches through a four-pole alternator switch.

Referring first to the alternator switch itself, shown in Figs. 1 and 2 of the drawings, the switch-actuating magnet 40, which is here of the clapper type, is mounted upon the usual panel; and within the slotted tail of the armature 41 is pivotally mounted a member 42 the free end of which is taperingly widened and slotted to form a central projection 43 and two lateral projections with inner inclined cam edges 42$^r$ and 42$^1$ and is yieldingly held in normal operative position by the spring 44, which spring is fixed at one end to a pin 45 set into the member and at its other end to the panel and further serves, as it is put under increased tension when the armature is drawn into the magnet coil on the energization thereof, to supplement gravity in swinging the armature 41 so as to thrust the member 42 rearwardly when the armature is released on the de-energization of the magnet coil. The upper and lower movable switch contact 17, 17$^a$ and 18, 18$^a$ (17 and 18 only being shown), operatively related to upper and lower fixed contacts 19, 19$^a$ and 20, 20$^a$ (the latter not shown) fixed to the panel, are carried, resiliently mounted thereon as shown, at the opposite ends of one or more elbow pole-pieces 21, 21$^a$ which are clamped or otherwise suitably secured in place upon a rock-shaft 22, of insulating material, which rock-shaft is journaled at each end in bearings in supports 23, 23 fixed to the panel and so positioned thereon that a projection of the axis of the shaft will intersect the projected central longitudinal axis of the member 42 as yieldingly and normally positioned by the spring 45. A member 54 is fixed to the end of the rock-shaft 22 adjacent and to cooperate with the member 42. This member, in the form of a disk, carries set therein, on opposite sides of its axis, pins 54$^r$ and 54$^1$ which project therefrom into the path of travel of the cam edges of the member 42.

Means for locking the member 54 and with it the rock-shaft 22 at the limit of its rocking movement in either direction, to thereby lock in closed position whichever set of switch contacts have been closed thereby, are provided by two lock members 55 and 56 which at one end are pivotally supported upon the panel, at their free ends are cut away at their inner edges to provide shoulders 55ʳ and 56¹ operatively related to the pins 54ʳ and 54¹ respectively, and are connected and yieldingly drawn towards each other by light spring 57.

The operation of the switch, as will be apparent, is as follows: Starting with the device in the position shown, when the magnet is de-energized the armature is rocked on its pivot, by gravity supplemented by the pull of spring 44, and the member 42 is thrust back towards the panel with the result that the cam edge 42¹ engaging pin 54¹ slides thereon and swings the free end of member 42 upwardly to thereby push back the lock member 56 and withdraw its shoulder from behind the pin and then, when the bottom of the slot reaches the pin, the disk and with it the rock-shaft are rocked to open the lower contact 18 and 20 and close the upper contacts 17 and 19, the pin 54ʳ being at the same time moved forwardly until the shoulder on lock member 55 can spring behind it to lock the rock-shaft and switch contacts in the position into which they have thus been shifted. On the energization of the magnet the member 42 is drawn forward against, and positioned as before by, the tension of spring 44; and when the magnet is again deenergized the cam edge 42ʳ and the bottom of the slot in which it ends successively engage pin 54ʳ, to first unlock and then rock the rock-shaft to open the upper contacts 17 and 19 and close the lower contacts 18 and 20, and these parts are again locked in position by the engagement of the shoulder 56¹ with the pin 54¹. The cycle of operations thus completed is then repeated, with the result that the two sets of switch contacts are unlocked and opened and closed and locked alternately on successive de-energizations of the magnet and are in no way affected by the energization of the magnet.

Referring now to the duplex motor system illustrated in Fig. 3, M¹ and M² designate the two motors, S¹ and S² designate the starters by which the motors are respectively connected with the line wires L¹ and L² and L³, F¹ and F² designate two float switches, and A designates a four-pole double-throw alternator switch through which the actuating circuits of the motor starters are controlled by the float switches. The control circuit connections and the operation of the system are as follows: With the contacts of the alternator switch A locked in the position shown, the closure of float switch F¹, on a drop of the fluid in a tank as shown, establishes a circuit from line wire L² of motor M¹ by wire a, upper contacts 17 and 19 of alternator switch A, wire b, contacts of float switch F¹, wire c, upper contacts 19ᵃ and 17ᵃ of alternator switch A, and wire d through the magnet coil s' of motor starter S¹ to the line wire L². Starter S¹ is thereupon actuated to connect motor M¹ to the line and thereby start that motor; and in so doing closes auxiliary switch 100 and so establishes a circuit between the same line wires L² and L¹ by wires e and f, switch 100, and wires g and h through the coil of magnet 40 of the alternator switch, which magnet thus energized raises its armature without, as seen, affecting the position of the switch contacts and continues to hold the armature raised so long as motor M¹ is running. If and when float switch F² is closed, as on a further drop of the fluid in the tank, starter S² will be actuated, to start motor M², by the establishment of a circuit between the line wires L² and L¹ of this second motor by wire a', upper contacts 17ᶜ and 19ᶜ of alternator switch A, wire i, contacts of float switch F², wire j, upper contacts 19ᵇ and 17ᵇ of alternator switch A, and wire d' through the magnet coil s'' of the starter. With both motors running, a rise of the fluid in the tank will first open float switch F², thereby breaking the circuit through the magnet coil of its starter and stopping motor M², and later will open float switch F¹ to break the circuit through the magnet coil of starter S¹ and not only stop the motor M¹ but also, by the opening of auxiliary switch 100, break the circuit of and de-energize the magnet 10 of the alternator switch, the effect of which, as hereinabove described, is to shift the contacts of this switch, the upper to open and the lower to closed position. The circuit connections between the float switches and the starters of the two motors have now been reversed. Hence, when float switch F¹ is again closed motor M² will be started by the actuation of its starter, through the circuit established between its line wires L² and L¹ by wire a¹, lower contacts 18ᶜ and 20ᶜ of alternator switch A, wires c' and c, contacts of float switch F¹, wires b and b', lower contacts 20ᵇ and 18ᵇ of alternator switch A, and wire d' through the magnet coil s'' of its starter, and at the same time auxiliary switch 101 will be closed and again establish the circuit of and energize magnet 40 of the alternator switch without affecting the position of its contacts; and now motor M¹ will be started in sequence on closure of float switch F² and the establishment thereby of a circuit between line wires L² and L¹ of that motor by wire a, lower contacts 20 and 18 of alternator switch A, wires j' and j, contacts of float switch F², wires i and i', lower contacts 20ᵃ and 18ᵃ of alternator switch A, and wire d through the magnet coil s' of its starter. On the next succeeding opening of the float switches motor M¹ and M² will be stopped in that sequence, and with the stopping of motor M² auxiliary switch 101 will be opened, magnet 40 of the alternator switch A will be de-energized, and the contacts of that switch will again be shifted, the upper back to closed and the lower back to open position, for a repetition of the cycle of operations described.

While I have explained the principle of my invention in connection with the forms I now consider best for the practical embodiment thereof, it is to be understood that the invention can be further variously modified in its several details, within the scope of the appended claims, without departing from the spirit or sacrificing the substantial advantages thereof.

What I claim as new, and desire to secure by Letters Patent, is—

1. In a double-throw switch, the combination of a switch mechanism comprising fixed contacts spaced apart and cooperatively related to make contact therewith oppositely disposed movable contacts carried by a rock-shaft mounted intermediate the fixed contacts whereby when the rock-shaft is rocked in either direction one set of contacts is opened and the other closed, switch-actuating means comprising an electromagnet and one-way operative connections between its armature and the rockshaft whereby the shaft is rocked alternately first in one and then in the opposite direction by successive movements of the armature in one direction and is not affected by the movements of the armature in the opposite direction, and means for releasably locking the rock-shaft at the limit of its movement in either direction to thereby hold firmly together the then closed set of contacts while the shaft is not operatively connected with the armature of the electromagnet.

2. In a plural-pole double-throw switch, the combination of a switch mechanism comprising a plurality of fixed contacts arranged in two spaced rows and cooperatively related to make butt-contact therewith movable contacts carried in rows by a plurality of pole-pieces fixed upon a rock-shaft whereby when the shaft is rocked in either direction one set of contacts will be opened and the other set of contacts will be closed, switch-actuating means comprising an electromagnet and one-way operative connections between its armature and the rock-shaft whereby the shaft is rocked alternately first in one and then in the opposite direction by successive movements of the armature in one direction and is not affected by the movements of the armature in the opposite direction, and means releasably locking the rock-shaft at the limit of its movement in either direction to thereby hold firmly together the then closed set of contacts while the armature of the electromagnet is withdrawn from operative connection with the shaft.

3. In a double-throw switch, the combination, with a switch mechanism comprising fixed contacts and a rock-shaft mounted intermediate thereof and carrying oppositely disposed movable contacts adapted when the shaft is rocked to make spring-pressed butt-contact with the fixed contacts on the opposite sides of the shaft alternately, switch-actuating means comprising a rock-member fixed to an end of the rock-shaft, an electromagnet, an actuating-member pivotally carried by the armature of the electromagnet to reciprocate therewith towards and from the rock-shaft adjacent the face of the rock-member and to swing in a plane perpendicular to the axis of the rock-shaft, centering means adapted to yieldingly hold the free end of the actuating-member in a line of travel intersecting the axial line of the rock-shaft, and cooperating elements carried by said members respectively whereby on successive reciprocatory movement of the actuating-member in one direction it will be swung from its normal line of travel into operative engagement with the rock-member on opposite sides of its axis alternately to thereby rock the rock-shaft first in one direction and then in the opposite direction and on each reciprocatory movement in the opposite direction will be operatively disconnected from the rock-shaft and restored to its normal line of travel, and switch-locking means adapted to releasably press the rock-shaft at the limit of its movement in either direction and thereby hold firmly together the then closed contacts while the actuating-member is operatively disconnected from the rock-member.

4. In a plural-pole double-throw switch, the combination of a switch mechanism comprising a plurality of fixed contacts arranged in two spaced rows and a rock-shaft mounted intermediate thereof and carrying oppositely disposed rows of movable contacts adapted when the shaft is rocked to make spring-pressed butt-contact with the fixed contacts on the opposite sides of the shaft alternately, switch-actuating means comprising a rock-member mounted in operative relationship with and adapted to rock the rock-shaft, an electromagnet, an actuating member pivotally carried by the armature of the electromagnet to reciprocate therewith towards and from and to swing in a plane perpendicular to the axis of the rock-member, means including cooperating element carried by said rock- and actuating-members respectively whereby on successive reciprocatory movements of the actuating-member towards the rock-member the former will be swung from its normal line of travel into operative engagement with the rock-member on opposite sides of its axis alternately to thereby rock the rock-shaft first in one direction and then in the opposite direction and on each reciprocatory movement away from the rock-member will be operatively disconnected therefrom and returned to its normal line of travel, and means for releaseably locking the rock-shaft at the limit of its movement in either direction to thereby hold firmly pressed together the then closed contacts while the actuating-member is operatively disconnected from the rock-member.

5. In a double-throw switch, the combination, with a switch mechanism comprising fixed contacts and a rock-shaft mounted intermediate thereof and carrying oppositely disposed movable contacts adapted when the shaft is rocked to make contact with the fixed contacts on the opposite sides of the shaft alternately, of switch actuating and locking means comprising an electromagnet, an actuating-member pivotally carried by the armature of the magnet to reciprocate therewith to and from the rock-shaft adjacent an end thereof and to swing in a plane perpendicular to the axis of the rock-shaft and slotted at its free end to provide thereat lateral projections having oppositely disposed outwardly extending cam edges terminating centrally near the axis of the member in abutment shoulders, centering means adapted to normally hold the free end of the actuating-member to a line of travel intersecting the axial line of the rock-shaft, a rock-member fixed to the end of the rock-shaft adjacent the actuating-member and carrying on opposite sides of its axis pins projecting therefrom into the plane of the actuating-member, and two lock-members mounted to yieldingly bear with their inner edges against the two pins of the actuating member respectively and cut away thereat to provide locking shoulders adjacent their free ends, the several parts being so operatively related that when the rock-shaft is rocked to the limit of its movement in either direction the pin on the opposite side of the rock-lever will be engaged by the shoulder of the cooperating lock-member and locked thereby in position in the path of travel of the tip of the lateral projection on that side of the free end of the actuating-member.

WILLIAM DEANS.